April 25, 1939.　　　H. L. DE FREES　　　2,155,968
FURNACE OR THE LIKE
Filed Sept. 11, 1937　　　2 Sheets-Sheet 1

INVENTOR.
H. L. DeFREES
BY M. Talbert Dick
ATTORNEY.

April 25, 1939.        H. L. DE FREES        2,155,968
FURNACE OR THE LIKE
Filed Sept. 11, 1937        2 Sheets-Sheet 2

INVENTOR.
H. L. DeFREES
BY M. Talbert Dick
ATTORNEY.

Patented Apr. 25, 1939

2,155,968

UNITED STATES PATENT OFFICE 2,155,968

FURNACE OR THE LIKE

Harry L. De Frees, Des Moines, Iowa

Application September 11, 1937, Serial No. 163,412

3 Claims. (Cl. 126—109)

The principal object of my invention is to provide a heater or furnace of high efficiency having a great amount of heat radiating surface adjacent the combustion chamber.

A further object of this invention is to provide a furnace or the like which has a great amount of heat travel within the jacket for the efficient utilization of the heat units produced.

A still further object of my invention is to provide a furnace or the like having a forced draft system for forcing fresh air adjacent and around the heat radiating surface to aid in the more efficient absorption of heat and to issue a uniform volume of heated air through the heat conducting system.

A still further object of this invention is to provide a furnace or the like that is extremely compact in its construction, and that will deliver a great amount of heat to the radiating system with a small amount of combustible material.

A still further object of my invention is to provide a furnace or the like that is economical in manufacture, durable in use and efficient in operation.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

There are a great number of heating stoves and furnaces now on the market. Few of these, however, are designed for modern heating methods. Those furnaces designed for oil burners, gas and the like rely on long firing chambers in order to get the maximum amount of radiation directly from the side walls of the combustion chamber. This makes the furnace quite bulky and, due to the lack of multiple radiating surfaces directly adjacent the greatest point of heat, does not utilize to the fullest extent the heat units available. Furthermore, these furnaces do not lend themselves well to the use of forced draft; especially is this so when it is desired to run fresh air in and through the heating system instead of utilizing the natural circulation through cold air pipes and the like. The propelled air does not contact all of the radiating surface and due to their bulkiness, the full efficiency of the forced draft circulation can not be attained.

The main objection to the furnaces now on the market is chiefly their lack of radiating surface at the point of most intense heat. I have overcome such disadvantages as will be appreciated and hereinafter more fully set forth.

Figure 1:
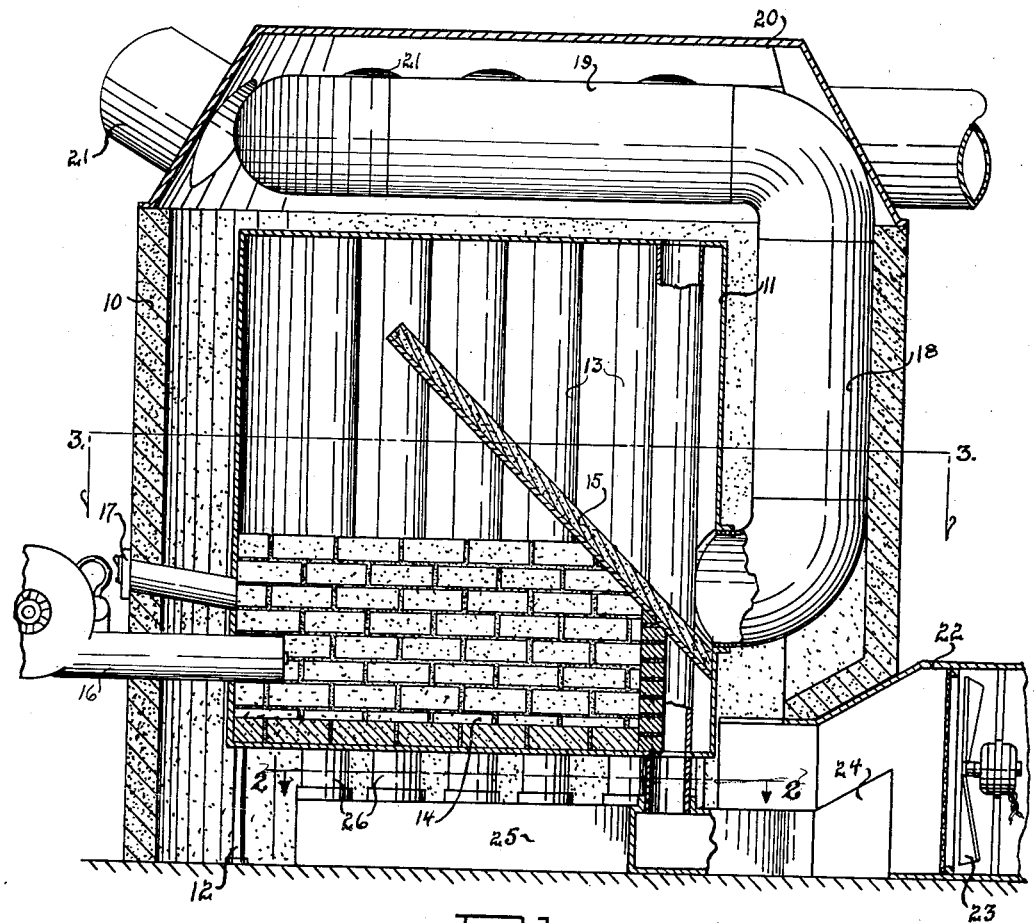
Fig. 1 is a side sectional view of my complete furnace ready for use.
Figure 2:
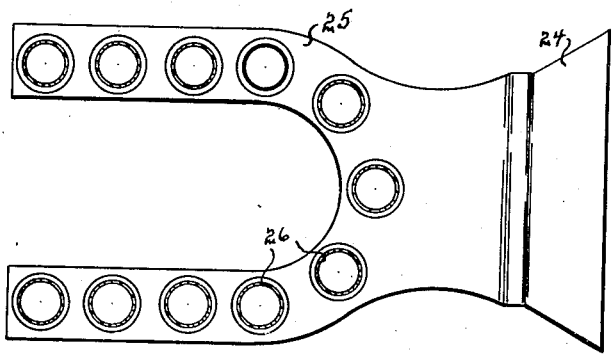
Fig. 2 is a top sectional view showing the auxiliary or flue draft ventilating system taken of my device and more fully illustrates its construction and is taken on line 2—2 of Fig. 1.
Figure 3:
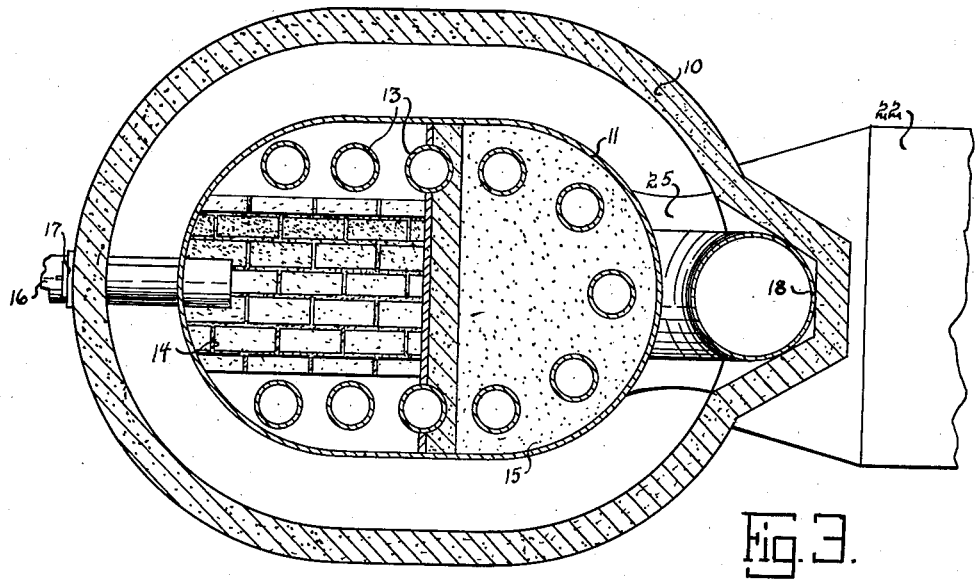
Fig. 3 is a top sectional view of my complete furnace and more fully illustrates Fig. 1, being taken on the line 3—3 of Fig. 1.

Referring to the drawings, I have used the numeral 10 to designate the outer jacket or casing of the heat chamber which may be constructed of any fire resistant insulative material such as brick or the like. Positioned within the casing or jacket 10 is the heating chamber 11. This heating chamber 11 is of a considerably smaller dimension than the inside dimensions of the jacket 10 allowing the free circulation of warmed air about the chamber 11 as shown in the drawings. I have used the numeral 12 to designate legs secured to the bottom portion of the chamber 11 for elevating it or suspending it within the jacket 10. The numeral 13 designates a plurality of vertical flue pipes positioned within the chamber 11 and opening through the top and bottom ends of the chamber 11. These flue pipes are positioned in approximate U-shape about the chamber 11 as shown in Fig. 3. I have used the numeral 14 to designate a combustion chamber positioned below the central portion of the heating chamber 11. This combustion chamber is of the usual type constructed of fire brick or the like and has its top side open. The numeral 15 indicates a baffle wall extending upwardly and forwardly within the chamber 11 over the combustion chamber 14 as shown in Fig. 1. This baffle plate is constructed of a heat resisting material. I have used the numeral 16 to designate an ordinary oil burner or the like which extends through the casing 10, the forward wall of the heating chamber 11 and resting within the combustion chamber 14.

Figure 4:
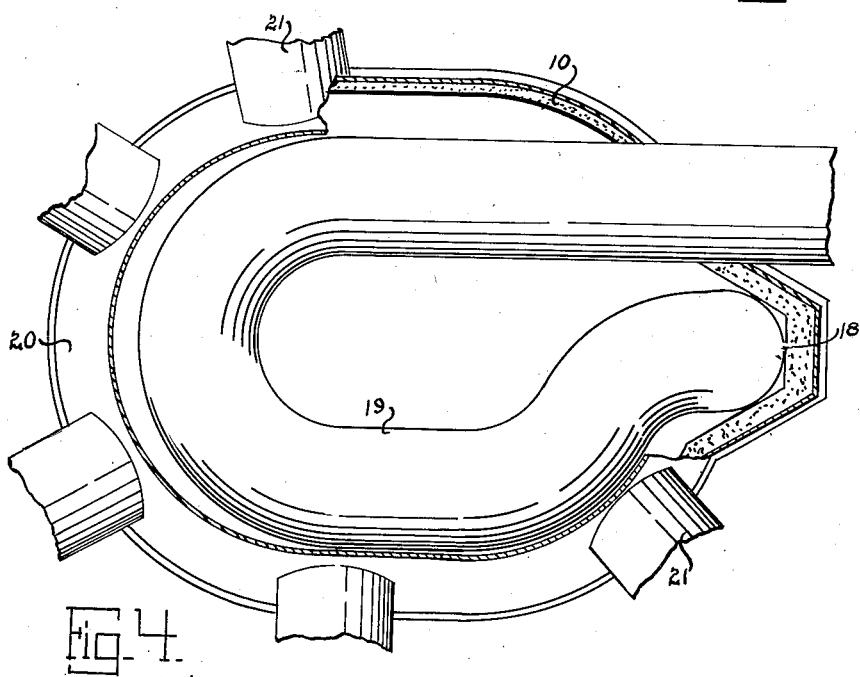
Fig. 4 is a top plan sectional view of the distributing dome of my furnace and more fully illustrates its construction.

The numeral 17 designates an ordinary viewing tube so that the operator may readily see the flame within the combustion chamber. The numeral 18 designates the exhaust stack entering into the rearward wall of the heating chamber 11 just above the baffle plate 15. This stack 18 extends upwardly within the casing 10 and thence making a loop or smoke ring 19 directly above the heating chamber 11 as shown in Fig. 4. The outlet of this stack communicates with the ordinary chimney. The purpose of the smoke ring 19 is to allow for the absorption of more heat units from the hot gases within the stack. I have used the numeral 20 to designate a dome placed over the entire furnace in the usual manner. Leading from this dome 20 are a plurality of heating pipes 21. I have used the numeral 22 to designate a fresh air intake in communication between a source of air and the inside of the jacket 10. Positioned within this intake 22, is an ordinary electrically operated fan 23. This fan 23 is for the purpose of forcing fresh air in through the conduit or intake 22 and, within the jacket 10, and about the heating chamber 11. The numeral 24 designates an auxiliary air flow chamber positioned within the conduit 22 so that it may receive part of the air forced into the furnace by the fan 23. The numeral 25 designates a U-shaped chamber having a plurality of upwardly extending conduits 26 in communication therewith. The other ends of these conduits 26 are in communication with each of the tubes or flues 13, respectively.

The practical operation of my device is as follows: The oil burner or like 16 is placed in operation. The direct blast of the fire or burning materials will be within the combustion chamber 14. The hot gases will pass upwardly and forwardly over the top end portion of the baffle 15, thence downwardly through the stack 18, thence through the smoke ring 19 and out through the chimney or like. This will heat the walls of the heating chamber 11 as well as the inner walls of each of the tubes or flues 13. The fan 23 will be placed in operation, thereby forcing air upwardly through the jacket 10, about the outer walls of the heating chamber 11, thence around the smoke ring or collector 19 and out into the heating system through the pipes or conduits 21. Some of the air propelled by the fan 23 will enter the auxiliary chamber 24 and through the medium of the U-shaped chamber 25, forcing a portion of the air up through the tube 15. This air will be heated by its contact with the walls of the tube, will rise upwardly into the dome 20 together with the hot air flowing up the outside of the chamber 11 within the jacket 10 and thence out through the conduits 21 into the heating system.

By the use of the plurality of tubes 13, the radiating surface of the heating chamber is greatly enlarged for not only is heat radiated from the outer walls of the chamber but also from the inner walls of each of the tubes. This combined area provides a great amount of radiating surface directly adjacent the combustion chamber or point of greatest heat. The use of the fan in forcing the air through the tubes 13 as well as about the chamber 11 makes my furnace very efficient inasmuch as a great volume of air can be handled and heated.

Obviously, any type of combustion apparatus may be used such as an automatic stoker, gas heating or the like, and it is to accommodate these various types of heating apparatuses that I have made the chamber 25 of a U-shape. This provides an ash pit or additional space for the utilization of various types of vertical burners and the like, directly below the combustion chamber 14 of my device. Great efficiency can be had from my specific construction due to the great amount of radiation surface available within a limited space, thereby allowing the absorption of a great percentage of the heat radiated as well as accommodating a greater volume of air adjacent to the heating chamber. This is aided, too, by the smoke ring 19, allowing for readily controlled and reduced stack temperatures while at the same time procuring a greater majority of the heat units available for heating. Thus I have provided a furnace or the like that fulfills all of my objects, is highly efficient and due to its structure permits the use of a smaller, more economical furnace for heating purposes, while at the same time obtaining such a volume of heated air as it would only be possible to obtain with the ordinary type of construction in a vaster larger unit. My device also permits and efficiently utilizes and heats fresh air and can efficiently take advantage of forced draft heating.

Some changes may be made in the construction and arrangement of my improved furnace or the like without departing from the real spirit and purpose of my invention, and it is my intention to cover by my claims any modified forms of structure or use of mechanical equivalents which may be reasonably included therein.

I claim:

1. In a device of the class described, an outer housing, a main inlet conduit extending into said housing, a heating chamber inside said outer housing, a plurality of vertical flues having their upper ends extending through said heating chamber and adjacent the side and rear walls of said heating chamber, and a horizontally arranged U-shaped duct below said heating chamber and in communication with each of the lower ends of said flues; said duct having its mid-portion provided with an air intake chamber communicating with said inlet conduit.

2. In a device of the class described, an outer housing, a main inlet conduit extending into said housing, a heating chamber inside said outer housing, a plurality of vertical flues having their upper ends extending through said heating chamber and adjacent the side and rear walls of said heating chamber, a horizontally arranged U-shaped duct below said heating chamber and in communication with each of the lower ends of said flues; said duct having its mid-portion provided with an air intake chamber communicating with said inlet conduit, and a baffle plate inside said heating chamber extending upwardly and forwardly from the back portion of said heating chamber.

3. In a device of the class described, an outer housing, a main inlet conduit extending into said housing, a heating chamber inside said outer housing, a plurality of vertical flues having their upper ends extending through said heating chamber, and adjacent the side and rear walls of said heating chamber, a horizontally arranged U-shaped duct below said heating chamber and in communication with each of the lower ends of said flues; said duct having its mid-portion provided with an air intake chamber communicating with said inlet conduit, a combustion chamber within said heating chamber, an outlet pipe communicating with the inside of said heating chamber, and an outlet pipe communicating with the inside of said first mentioned housing.

HARRY L. DE FREES.